July 11, 1944.  G. R. G. GATES  2,353,554
ENDLESS TRACK VEHICLE
Filed Oct. 27, 1941  2 Sheets-Sheet 1

Inventor:
G. R. G. Gates
By Stevens & Davis
Attys.

July 11, 1944.  G. R. G. GATES  2,353,554

ENDLESS TRACK VEHICLE

Filed Oct. 27, 1941  2 Sheets—Sheet 2

Inventor:—
G. R. G. Gates
By Stevens & Davis
Attys.

Patented July 11, 1944

2,353,554

UNITED STATES PATENT OFFICE 2,353,554

ENDLESS TRACK VEHICLE

Geoffrey Robert Greenbergh Gates, Leamington Spa, England, assignor to Automotive Products Company Limited, Leamington Spa, England Application October 27, 1941, Serial No. 416,733
In Great Britain November 19, 1940

13 Claims. (Cl. 180—9.2)

This invention relates to endless track vehicles such as tanks, and has for its object to provide an improved transmission gearing between the engine of the vehicle and the tracks, which enables the relative speed of the two tracks to be varied in a simple and effective manner for steering the vehicle.

According to one aspect of the invention, the drive from the engine of the vehicle is transmitted to the tracks through two driving clutches, the driven elements of which are geared respectively to the two halves of a divided axle, the two halves of the divided axle being coupled by a differential gear, and means being provided for restricting or controlling the rotation of the casing of the said differential gear.

The drive from the engine may be transmitted to the driving elements of two driving clutches, the driven elements of which are geared respectively to the two halves of a divided axle from which the track drive sprockets are driven, the two halves of the divided axle being coupled by a differential gear, and means being provided for restricting or controlling the rotation of the casing of the said differential gear.

According to another aspect of the invention, the transmission gearing comprises a variable speed gearbox, a transverse shaft driven from said gearbox and carrying the driving members of two driving clutches through which the tracks are driven, a divided axle the two halves of which are driven respectively by the two driving clutches, a differential gear between the two halves of the divided axle, and a friction device for restricting or controlling the rotation of the casing of said differential gear.

The friction device may comprise a brake or a controlling clutch adapted to couple the differential casing through gearing to the transverse shaft. The controlling clutch may be concentric with the divided axle, and may couple the differential casing to a gear wheel mounted freely on the said axle, or may be concentric with the transverse shaft and arranged to couple a gear meshing with a gear on the differential casing to the said transverse shaft. The driving clutches may have their driving and driven members mounted respectively on the transverse shaft and on a pair of intermediate shafts, each of the intermediate shafts being geared to one-half of the divided axle.

The driving clutches may have their driving and driven members mounted respectively on the transverse shaft and on a pair of intermediate shafts, each of the intermediate shafts being geared to one-half of the divided axle, and the gearing between the differential casing and the transverse shaft having a greater reduction ratio than the gearing between the intermediate shafts and the divided axle.

A control system is preferably provided for simultaneously releasing either one of the driving clutches and engaging the restricting or controlling means for the differential casing, and the driving clutches and restricting or controlling means may be actuated by fluid pressure. The initiation of a steering operation may simultaneously admit a supply of fluid under pressure to the engaging mechanism of the restricting or controlling means and to a selector valve from which it is fed to the releasing mechanism of one of the driving clutches.

The invention is hereinafter described with reference to the accompanying drawings, in which—

Figure 1:
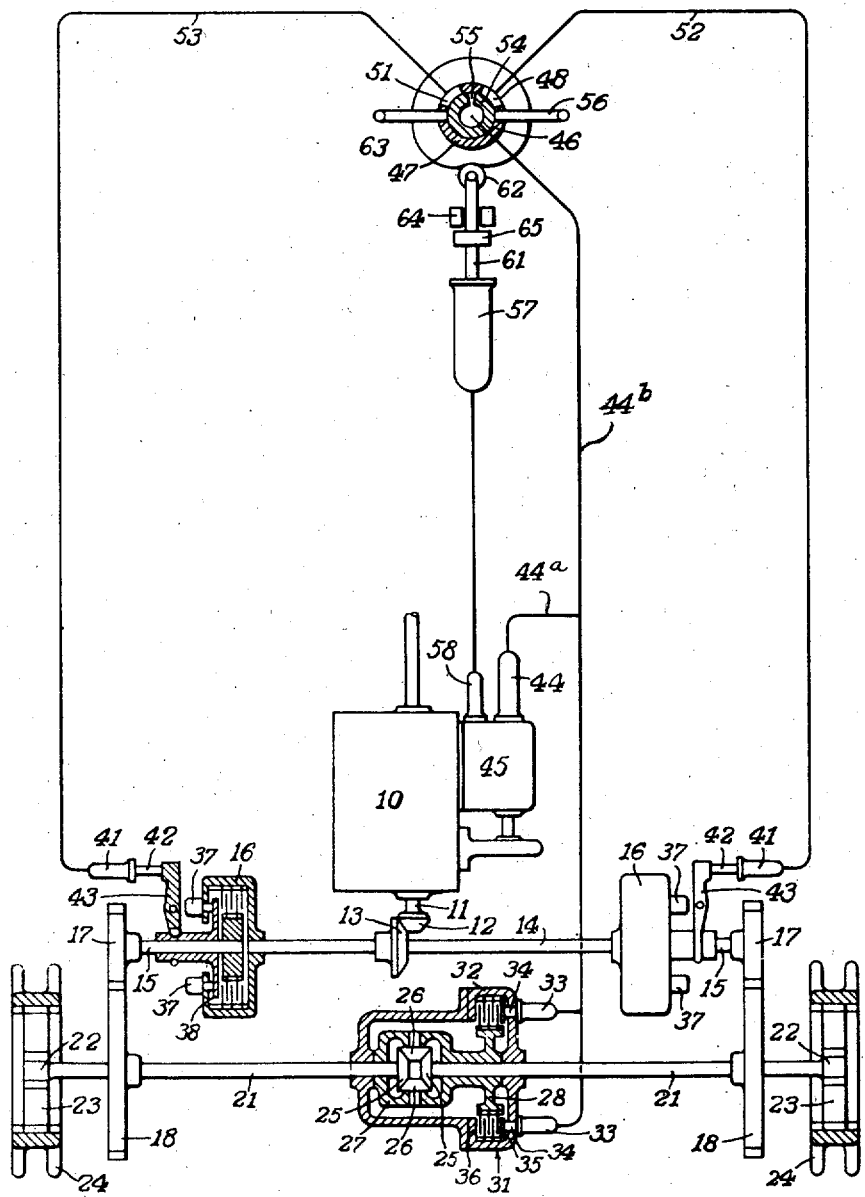
Figure 1 is a diagram showing one form of transmission gearing according to the invention and a control system for the said gearing.

In the embodiment of the invention, which is shown in Figure 1, the engine of the vehicle is coupled through a clutch of any convenient type (not shown) to a change-speed gearbox 10 having a plurality of constant-mesh gear trains to provide (for example) four forward speeds and one reverse speed, the gears being engaged by means of dog clutches operated by selector mechanism in the well-known manner. The gearbox is mounted longitudinally in the vehicle, and its output shaft 11 carries a bevel gear 12 meshing with a corresponding bevel gear 13 on a transverse shaft 14. At each end of the transverse shaft 14 is a co-axial intermediate shaft 15 between which and the transverse shaft 14 is arranged a multi-plate type friction clutch 16. On each intermediate shaft 15 is mounted a gear 17 meshing with a gear 18 on one-half 21 a divided axle, each half 21 of which is connected at its outer end through reduction gearing 22, 23 to the drive sprockets 24 for the track on one side of the vehicle. The inner ends of the two half-axles 21 have mounted on them the bevel gears 25, 25 of a differential unit, the pinions 26, 26 of which are carried by a casing 27 free to revolve relatively to the half-axles 21 and to the vehicle frame. To the differential casing 27 is connected the revolving member 28 of a multi-disc type brake 31, the fixed member 32 of which is anchored to the vehicle frame.

The clutches 16 and the brake 31 are operated by liquid pressure. The brake 31 is applied by the pressure acting in a circumferential series of cylinders 33 arranged about the fixed member of the brake and having pistons 34 engaging a pressure plate 35 which presses together a pack of discs and urges them towards a fixed abutment surface 36. Alternate discs of the pack have outward projections to engage with splines on the fixed member 32 of the brake, whilst the intermediate discs have inward projections to engage with splines on the revolving member 28 of the brake. The brake is released by springs (not shown) acting to move the pressure plate away from the abutment surface. The clutches 16 are engaged by springs in the well-known manner, the springs being mounted in spring cups 37, and acting on pressure plates 38. The clutches are released by liquid pressure acting in cylinders 41, the pistons 42 in which engage rocking levers 43 acting to withdraw the pressure plates 38 of the clutches.

The pressure for controlling the transmission is supplied by a liquid pressure master cylinder 44, the piston in which is operated by a friction type torque-applying unit 45 which may be as described in our British patent specification No. 525,415, the driving part of the unit 45 being driven from the output shaft of the gear-box so that it is operative at any time when the vehicle is in motion. The liquid pressure master cylinder 44 is coupled directly by a pipe-line 44a to a pipe-line 44b which latter is connected at one end to the liquid pressure cylinders 33 on the brake unit 31, and at the other end to a manually controlled valve 46 by which it may be connected at will to either of the liquid pressure cylinders 41 on the two clutches 16. The valve 46 is of a rotary type, and comprises a fixed cylinder 47 having two circumferentially spaced ports 48, 51 connected respectively to the pipe-lines 52 and 53 leading to the cylinders 41, and a rotatable cylinder unit 54 mounted within the fixed cylinder 47 and formed with a single port 55 adapted to be obturated by the portion of the fixed cylinder between the two ports 48 and 51 therein, or to communicate with one or other of those ports, according to the angular relation of the two cylinders. The interior of the inner cylinder 54 is connected to the pipe-line 44b. The inner rotatable cylinder 54 has mounted on it a handle-bar 56 for manual operation. Adjacent the valve 46 is mounted a liquid pressure master cylinder 57 connected by a pipe-line to the cylinder 58 by which the torque-applying unit 45 is brought into action, and the piston of this master cylinder is operated by a rod 61 carrying a roller 62 engaging a cam 63 turning with the handle-bar 56. The degree of operation of the torque-applying unit is controlled as described in our British Patent Specification above referred to, so as to permit progressive operation of the brake unit according to the degree of turning of the manual control. A foot pedal operated fork 64 is also provided which engages with a collar 65 on the rod 61 and operates the torque applying unit independently of the selector valve.

The transmission operates in the following manner. For straightforward or rearward driving of the vehicle, the clutches 16 are both engaged and the brake 31 is free, the handle-bar 56 being in its central position. The two tracks are both, therefore, independently driven through their respective clutches 16 and gear trains, and the differential casing revolves with the two halves of the divided shaft.

If the handle-bar 56 is turned in one direction or the other, pressure is created in the master cylinder 57 and the torque applying unit 45 is brought into action to produce liquid pressure. The turning of the handle-bar connects the pressure cylinder 41 of one of the clutches to the liquid pressure master cylinder 44. That clutch is, therefore, withdrawn, and the brake is applied to the differential casing 27, with the result that the vehicle turns towards the side on which the clutch 16 has been disconnected, the radius of turning depending on the degree of turning of the manual control, in view of the progressive action of the torque applying unit.

Thus, if the two clutches are engaged and the differential gear casing is free of restraint, the tracks on the two sides of the vehicle are both positively driven at the same speed to propel the vehicle in a straight line, whilst the disengagement of one clutch disconnects the drive from one side of the vehicle, with the result that the track on that side tends to slow down, though, due to its momentum, such slowing down is very gradual. The application of the brake to restrict the rotation of the differential casing, however, slows down the movement of the undriven track, and the vehicle is steered, the radius of turning depending on the degree of application of the brake. If the brake is applied to such an extent that the differential casing revolves at half the speed of the driven track the undriven track will remain stationary, and the vehicle will pivot about it, whilst if the brake is fully applied to lock the differential casing, the tracks will be driven with equal speeds in opposite directions, and the vehicle will pivot about its centre.

Since the momentum of the tracks varies with the speed of movement of the vehicle, the brake will have to do more work to steer the vehicle through a given radius at a high speed than at a low speed, and the steering will thus decrease in sensitivity as the speed increases, an important feature tending to assist stable control at high speeds. A sufficiently high degree of braking on the differential casing will stop the undriven track completely, thus causing the vehicle to pivot about that track, whilst a still greater degree of braking will produce reverse movement of that track, until, if the casing is locked, the two tracks are driven in opposite directions at equal speeds, and the vehicle pivots about its centre.

If the brake is applied by means of the pedal, with both clutches engaged, it retards the motion of the vehicle, and acts as a normal service brake.

Figure 2:
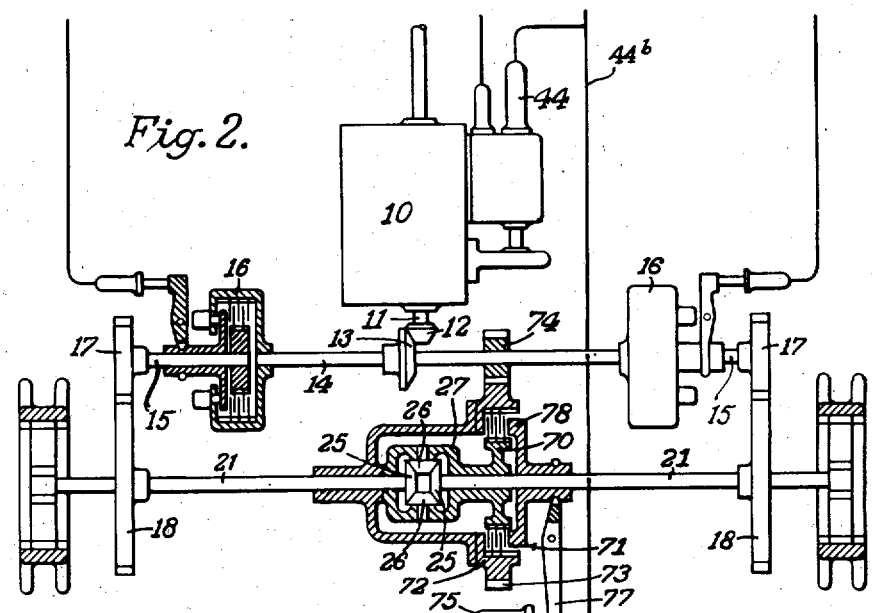
Figure 2 is a similar diagram showing another form of transmission gearing according to the invention.

The arrangements shown in Figure 2 comprises a gear-box 10, bevel gears 12 and 13, shaft 14 and clutches 16 driving the two half axles 21, through the intermediate shafts 15, and gear trains 17, 18, these parts corresponding with the parts similarly numbered in Figure 1. The two half axles 21—21 are coupled by a differential gear having bevel gears 25—25 and pinions 26—26, and the differential casing 27 carries one member 70 of a multi-plate clutch 71, the other member 72 of which is freely rotatable on the half axles 21—21 and has formed about its periphery a ring of gear teeth 73 meshing with a pinion 74 on the shaft 14. The ratio of the gear train 74—73 is such as to give a greater speed reduction than the gear trains 17—18 driving the half axles so that the clutch member 72 rotates in the same direction as the half axles at a speed which is a fixed ratio of the speed of those half axles, say for example, one half. The friction clutch, which is normally held out of engagement by springs (not shown) is engaged at will by liquid pressure acting in a cylinder 75 the piston 76 in which acts through a lever 77 on a pressure plate 78 forming part of the clutch. The cylinder 75 is directly connected to the master cylinder 44, by the pipe lines 44a and 44b, and the clutch is, therefore, engaged to a greater or less degree as soon as the handle-bar 56 is moved to initiate a steering operation. Thus the differential casing 27 is retarded, relatively to the half axle which continues to be driven, to an extent depending on the degree of engagement of the clutch, with a limiting condition when the clutch is fully engaged and the casing turns at half the speed of the shaft, when the free track will be stopped and the vehicle will pivot about it. The maximum degree of steering, that is the minimum turning circle, is dependent on the relative gear reductions between the extension shafts and the half axles, and the shaft carrying the driving clutches and the member to which the differential casing is clutched.

If the differential casing is geared to rotate at less than half the speed of the half shaft, the vehicle will pivot about a point within its track, but obviously this point can never be at the centre, as for pivoting about the centre it is necessary that the differential casing should cease to rotate.

With this arrangement, the free track is compelled to turn at a relatively slower speed than the driven track since, with the clutch engaged between the differential casing and the member to which it is clutched, its speed is positively controlled. Moreover, the momentum of the free track is transmitted back through the differential casing, clutch, and two gear trains to the driven track and is usefully absorbed instead of being dissipated as heat in a brake.

Figure 3:
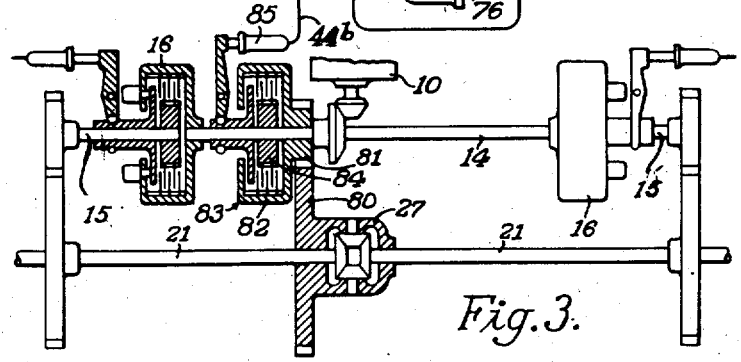
Figure 3 is another similar diagram with certain parts omitted, showing a further form of transmission gearing according to the invention.

Figure 3 shows an arrangement similar to that shown in Figure 2, but with the difference that the clutch in the gear train between the differential casing and the shaft 14 is mounted on the latter shaft. The differential casing 27 carries a gear wheel 80 meshing with a pinion 81 integral with the part 82 of the clutch 83 which is free on the shaft 14, the other part 84 of the clutch being fast on that shaft. The clutch is held released normally by springs (not shown) as in the previous example, and is engaged by liquid pressure supplied to a cylinder 85 by pipe-line 44b. The working of this arrangement corresponds exactly with that of the arrangement shown in Figure 2.

Figure 4:
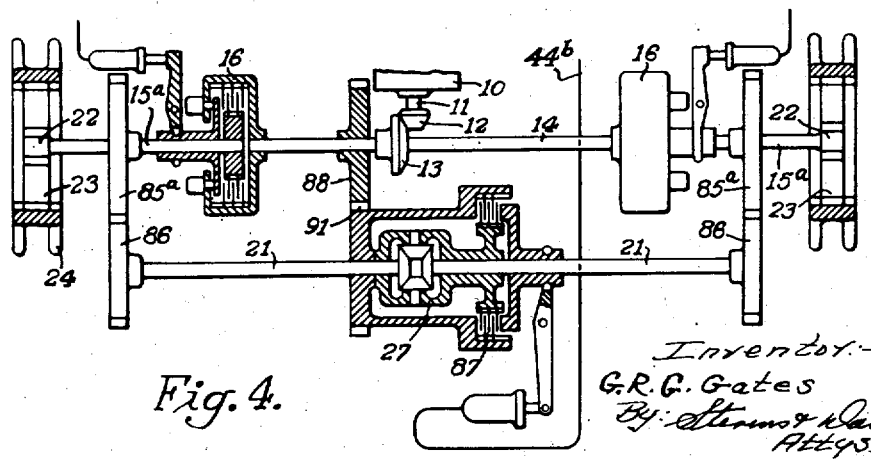
Figure 4 is a diagram similar to Figure 3 showing a still further modified form of transmission gearing according to the invention.

It is evident that the track drive sprockets 24 need not be driven from the half-axles 21, but may be separately driven from the output shafts 15a from clutches 16. Figure 4 shows an arrangement in which the intermediate shafts 15 of the previous arrangement are replaced by final drive shafts 15a carrying the pinions 22 of the final reduction gears 22, 23, and also carrying gears 85a of gear trains 85a, 86, driving the half-axles 21—21. The clutch 87 controlling the differential casing 27 is mounted co-axially with the half-axles 21—21, and the part of it which is rotatable relatively to the differential casing is geared to the transverse shaft 14 through gears 88 and 91. The gears 85 and 86 are so proportioned that the half-axles 21—21 run at a greater speed than the shaft 14, thus reducing the torque to be handled by the clutch. The gears 88 and 91 of course give a lower step-up ratio than the gears 85—86 so that engagement of the clutch 87 slows down the differential casing and effects steering of the vehicle.

It will be understood that the above description relates to only examples of the invention, and that many variations may be made in the various features of the transmission. Thus, the clutches and the brake may be other than the multi-plate type, and the single brake or clutch controlling the differential casing may be replaced by two smaller brakes or clutches for convenience of mounting or similar reasons. The brake and/or clutches may be operated in a manner other than that described, whilst the liquid pressure for operating the clutches and brake may be generated by a rotary pump, and may be stored in an accumulator from which it is released through a suitable control valve when a steering movement is initiated.

What I claim is:

1. Transmission gearing for driving the tracks of an endless track vehicle comprising a variable speed gear-box, a transverse shaft driven from said gear-box and carrying the driving members of two driving clutches through which the tracks are driven, a divided axle, the two halves of which are driven respectively by the two driving clutches, a differential gear between the two halves of the divided axle, and a controlling clutch adapted to couple the differential casing through gearing to the transverse shaft, and wherein the driving clutches have their driving and driven members mounted respectively on the transverse shaft and on a pair of intermediate shafts, each of the intermediate shafts being geared to one half of the divided axle, and the gearing between the differential casing and the transverse shaft having a greater reduction ratio than the gearing between the intermediate shafts and the divided axle.

2. Transmission gearing for driving the tracks of an endless track vehicle comprising a variable speed gear-box, a transverse shaft driven from said gear-box and carrying the driving members of two driving clutches through which the tracks are driven, a divided axle, the two halves of which are driven respectively by the two driving clutches, a differential gear between the two halves of the divided axle, and a controlling clutch adapted to couple the differential casing through gearing to the transverse shaft, and wherein the driving clutches have their driving and driven members mounted respectively on the transverse shaft and on a pair of final drive shafts, each of the final drive shafts being geared to one half of the divided axle, and the gearing between the differential casing and the transverse shaft having a lower step-up ratio than the gearing between the final drive shafts and the divided axle, the arrangement being such that the track drive sprockets are driven from the final drive shafts through gearing other than that driving the half-axles.

3. Transmission gearing for driving the tracks of an endless track vehicle comprising a variable speed gear-box, a transverse shaft driven from said gear-box and carrying the driving members of two driving clutches through which the tracks are driven, a divided axle, the two halves of which are driven respectively by the two driving clutches, a differential gear between the two halves of the divided axle, and a controlling clutch adapted to couple the differential casing through gearing to the transverse shaft, and wherein the driving clutches have their driving and driven members mounted respectively on the transverse shaft and on a pair of final drive shafts, each of the final drive shafts being geared to one half of the divided axle, and the gearing between the differential casing and the transverse shaft having a lower step-up ratio than the gearing between the final drive shafts and the dividend axle, the arrangement being such that the track drive sprockets are driven from the final drive shafts through gearing other than that driving the half-axles, and the half-axles are driven at a greater speed than the final drive shafts.

4. In a vehicle including a pair of endless tracks and a power source, a transmission for connecting said power source to drive the endless tracks, said transmission comprising a divided shaft, a differential gear connecting the two halves of the shaft, separate means each establishing a driving connection between the power source and one of the halves of said shaft, a normally engaged clutch in each of said means, said tracks being connected to the respective means at a point thereon more remote from the power source than the clutch, normally disconnected means for varying the rotational speed of the casing of the differential gear, and a control system for simultaneously selectively disengaging one of the clutches and connecting the means for varying the rotational speed of the casing of the differential gear.

5. In a vehicle including a pair of endless tracks and a power source, a transmission for connecting said power source to drive the endless tracks, said transmission comprising, a divided axle of one of the halves of which is connected to drive each endless track, a differential gear connecting the two halves of the divided axle, separate means establishing a driving connection between each half axle and the power source, a normally engaged clutch in each of said means, normally disconnected means for varying the rotational speed of the casing of the differential gear, and a control system for simultaneously selectively disengaging one of the clutches and connecting the means for varying the rotational speed of the casing of the differential gear.

6. In a vehicle including a pair of endless tracks and a power source, a transmission for connecting said power source to drive the endless tracks, said transmission comprising a divided shaft, a differential gear connecting the two halves of the shaft, separate means each establishing a driving connection between the power source and one of the halves of said shaft, a normally engaged clutch in each of said means, said tracks being connected to the respective means at a point thereon more remote from the power source than the clutch, a normally disengaged clutch, means operatively connecting one side of said normally disengaged clutch to one of the means establishing a driving connection at a point between the respective normally engaged clutch and the power source, means connecting the other side of said normally disengaged clutch to the casing of the differential gear, one of said last two named means being a direct connection and the other including gearing, means for selectively disengaging either of the normally engaged clutches, and means for engaging said disengaged clutch.

7. In a vehicle including a pair of endless tracks and a power source, a transmission for connecting said power source to drive the endless tracks, said transmission comprising a divided shaft, a differential gear connecting the two halves of the shaft, separate means each establishing a driving connection between the power source and one of the halves of said shaft, a normally engaged clutch in each of said means, said tracks being connected to the respective means at a point thereon more remote from the power source than the clutch, a normally disengaged clutch, one side of said normally disengaged clutch being mounted for rotation with the casing of the differential gear, the other side thereof being mounted for free concentric rotation about one of the halves of said divided shaft, said other side being provided with an external gear, a gear on one of said means establishing a driving connection at a point thereon between the power source and the respective normally engaged clutch, said gear meshing with the external gear of said other side of said clutch, means for selectively disengaging either of the normally engaged clutches, and means for engaging said disengaged clutch to establish a driving connection from the power source to the casing of the differential gear.

8. In a vehicle including a pair of endless tracks and a power source, a transmission for connecting said power source to drive the endless tracks, said transmission comprising a divided shaft, a differential gear connecting the two halves of the shaft, separate means each establishing a driving connection between the power source and one of the halves of said shaft, a normally engaged clutch in each of said means, said tracks being connected to the respective means at a point thereon more remote from the power source than the clutch, a normally disengaged clutch, one side of said normally disengaged clutch being mounted for rotation with one of said means establishing a driving connection at a point between the power source and the respective normally engaged clutch, the other side of said normally disengaged clutch being mounted for free concentric rotation about the same means establishing a driving connection in the same zone thereof as the first mentioned side of the normally disengaged clutch, said other side being provided with an external gear, a gear mounted for rotation with the casing of the differential gear, said last named gear meshing with said external gear, means for selectively disengaging either of the normally engaged clutches, and means for engaging said disengaged clutch to establish a driving connection from the power source to the casing of the differential gear.

9. A transmission as claimed in claim 4 in which the control system is hydraulic.

10. A transmission as claimed in claim 4 in which the control system is hydraulic and comprises a source of fluid under pressure and a manually operated valve in one position supplying pressure fluid to disengage one of the normally engaged clutches and to connect the normally disconnected means for varying the rotational speed of the casing of the differential gear, and in the other position supplying pressure fluid to disengage the other normally engaged clutch and to connect the normally disconnected means for varying the rotational speed of the casing of the differential gear.

11. A transmission as claimed in claim 4 in which the control system is hydraulic and comprises a source of fluid under pressure, a rotatable steering element, means responsive to angular displacement of said steering element in either direction for establishing a pressure fluid connection between the source of pressure fluid and the means for varying the rotational speed of the casing of the differential gear to cause connection of the same, and means responsive to the direction of rotation of said steering element for establishing a pressure fluid connection between one or the other of said normally engaged clutches and the first mentioned connection to selectively bring about disengagement of one or the other of the normally engaged clutches.

12. A transmission according to claim 4, wherein the control system is hydraulic and wherein the fluid pressure for disengaging the normally engaged clutches and for connecting the normally disconnected means for varying the rotational speed of the differential gear casing is generated by a piston and cylinder device, the piston of which is coupled to the driven member of a friction coupling device, the driving member of which is driven from the power source and is adapted to be moved into the cylinder to create liquid pressure when said friction coupling device is engaged, a cam and follower mechanism actuated by an angularly movable hand control arranged to engage the friction coupling device, the pressure generated in the piston and cylinder device being fed directly to the normally disconnected means for varying the rotational speed of the differential gear casing, and through a selector valve, also actuated by the hand control, to the actuated mechanism of one or the other of the normally engaged clutches to disengage the same.

13. In a vehicle including a pair of endless tracks and a power source, a transmission for connecting said power source to drive the endless tracks, said transmission comprising, a divided shaft, a differential gear connecting the two halves of the shaft, separate means each establishing a driving connection between the power source and one of the halves of said shaft, a normally engaged hydraulically operated clutch in each of said means, said tracks being connected to the respective means at a point thereon more remote from the power source than the clutch, means including a normally disengaged hydraulically operated clutch for varying the rotational speed of the casing of the differential gear, a source of fluid under pressure, a selector valve for establishing connection between one or the other of said normally engaged clutches and said fluid pressure source, said selector valve comprising a hollow cylindrical sleeve, a second hollow sleeve angularly movable in the first, the inner sleeve having a single radial port, the outer sleeve having two angularly spaced radial ports, each leading to a pipeline connected to one of the normally engaged clutches, means to turn the inner sleeve from a central position, in which the single port thereof is between the two ports in the outer sleeve, to a position in which said single port registers with one or the other of the ports in the outer sleeve, a pipeline connecting the interior of said inner sleeve with said fluid pressure source, and means responsive to rotation of said inner sleeve away from central position for applying fluid pressure from said source to the normally disengaged clutch.

GEOFFREY ROBERT GREENBERGH GATES.

---

CERTIFICATE OF CORRECTION.

Patent No. 2,353,554.                          July 11, 1944.

GEOFFREY ROBERT GREENBERGH GATES.

It is hereby certified that error appears in the printed specification of the above numbered patent requiring correction as follows: Page 1, second column, line 51, after the number "21" insert --of--; page 4, first column, line 16, for "dividend" read --divided--; line 43, after the word "axle" strike out "of"; and that the said Letters Patent should be read with this correction therein that the same may conform to the record of the case in the Patent Office.

Signed and sealed this 22nd day of August, A. D. 1944.

Leslie Frazer (Seal)                                     Acting Commissioner of Patents.

varying the rotational speed of the casing of the differential gear.

11. A transmission as claimed in claim 4 in which the control system is hydraulic and comprises a source of fluid under pressure, a rotatable steering element, means responsive to angular displacement of said steering element in either direction for establishing a pressure fluid connection between the source of pressure fluid and the means for varying the rotational speed of the casing of the differential gear to cause connection of the same, and means responsive to the direction of rotation of said steering element for establishing a pressure fluid connection between one or the other of said normally engaged clutches and the first mentioned connection to selectively bring about disengagement of one or the other of the normally engaged clutches.

12. A transmission according to claim 4, wherein the control system is hydraulic and wherein the fluid pressure for disengaging the normally engaged clutches and for connecting the normally disconnected means for varying the rotational speed of the differential gear casing is generated by a piston and cylinder device, the piston of which is coupled to the driven member of a friction coupling device, the driving member of which is driven from the power source and is adapted to be moved into the cylinder to create liquid pressure when said friction coupling device is engaged, a cam and follower mechanism actuated by an angularly movable hand control arranged to engage the friction coupling device, the pressure generated in the piston and cylinder device being fed directly to the normally disconnected means for varying the rotational speed of the differential gear casing, and through a selector valve, also actuated by the hand control, to the actuated mechanism of one or the other of the normally engaged clutches to disengage the same.

13. In a vehicle including a pair of endless tracks and a power source, a transmission for connecting said power source to drive the endless tracks, said transmission comprising, a divided shaft, a differential gear connecting the two halves of the shaft, separate means each establishing a driving connection between the power source and one of the halves of said shaft, a normally engaged hydraulically operated clutch in each of said means, said tracks being connected to the respective means at a point thereon more remote from the power source than the clutch, means including a normally disengaged hydraulically operated clutch for varying the rotational speed of the casing of the differential gear, a source of fluid under pressure, a selector valve for establishing connection between one or the other of said normally engaged clutches and said fluid pressure source, said selector valve comprising a hollow cylindrical sleeve, a second hollow sleeve angularly movable in the first, the inner sleeve having a single radial port, the outer sleeve having two angularly spaced radial ports, each leading to a pipeline connected to one of the normally engaged clutches, means to turn the inner sleeve from a central position, in which the single port thereof is between the two ports in the outer sleeve, to a position in which said single port registers with one or the other of the ports in the outer sleeve, a pipeline connecting the interior of said inner sleeve with said fluid pressure source, and means responsive to rotation of said inner sleeve away from central position for applying fluid pressure from said source to the normally disengaged clutch.

GEOFFREY ROBERT GREENBERGH GATES.

---

CERTIFICATE OF CORRECTION.

Patent No. 2,353,554. July 11, 1944.

GEOFFREY ROBERT GREENBERGH GATES.

It is hereby certified that error appears in the printed specification of the above numbered patent requiring correction as follows: Page 1, second column, line 51, after the number "21" insert --of--; page 4, first column, line 16, for "dividend" read --divided--; line 43, after the word "axle" strike out "of"; and that the said Letters Patent should be read with this correction therein that the same may conform to the record of the case in the Patent Office.

Signed and sealed this 22nd day of August, A. D. 1944.

Leslie Frazer (Seal) Acting Commissioner of Patents.